United States Patent
Laas

(10) Patent No.: US 11,365,277 B2
(45) Date of Patent: Jun. 21, 2022

(54) IONICALLY HYDROPHILIZED POLYISOCYANATES, WATER CONTENT

(71) Applicant: Covestro Intellectual Property GmbH & Co. KG, Leverkusen (DE)

(72) Inventor: Hans-Josef Laas, Odenthal (DE)

(73) Assignee: Covestro Intellectual Property GmbH & Co. KG, Leverkusen (DE)

(*) Notice: Subject to any disclaimer, the term of this patent is extended or adjusted under 35 U.S.C. 154(b) by 0 days.

(21) Appl. No.: 17/048,716

(22) PCT Filed: Apr. 23, 2019

(86) PCT No.: PCT/EP2019/060291
§ 371 (c)(1),
(2) Date: Oct. 19, 2020

(87) PCT Pub. No.: WO2019/206861
PCT Pub. Date: Oct. 31, 2019

(65) Prior Publication Data
US 2021/0171698 A1   Jun. 10, 2021

(30) Foreign Application Priority Data

Apr. 25, 2018 (EP) .................................... 18169338

(51) Int. Cl.
| C08G 18/08 | (2006.01) |
| C08G 18/28 | (2006.01) |
| C08G 18/38 | (2006.01) |
| C08G 18/79 | (2006.01) |
| C08G 18/80 | (2006.01) |
| C09D 175/08 | (2006.01) |

(52) U.S. Cl.
CPC ....... C08G 18/0828 (2013.01); C08G 18/288 (2013.01); C08G 18/3857 (2013.01); C08G 18/792 (2013.01); C08G 18/8083 (2013.01); C09D 175/08 (2013.01)

(58) Field of Classification Search
CPC .......................... C08G 18/08; C08G 18/0804; C08G 18/0819; C08G 18/0823; C08G 18/0828; C08G 18/288; C08G 18/3855; C08G 18/3857; C08G 18/3872; C08G 18/79; C08G 18/792; C08G 18/794; C08G 18/795; C08G 18/797; C08G 18/798; C08G 18/8083; C09D 175/00; C09D 175/04; C09D 175/08; C09D 175/10; C09D 175/12; C09D 175/14; C09D 175/16; C09J 175/00; C09J 175/04; C09J 175/08; C09J 175/10; C09J 175/12; C09J 175/14; C09J 175/16
See application file for complete search history.

(56) References Cited

U.S. PATENT DOCUMENTS

| 3,993,614 A * | 11/1976 | Carlson ............... C08G 18/0828 524/840 |
| 3,998,870 A * | 12/1976 | Carlson ............... C08G 18/0828 528/71 |
| 3,998,871 A * | 12/1976 | Carlson ............... C08G 18/0828 528/71 |
| 2004/0138403 A1 | 7/2004 | Rische et al. |
| 2008/0300338 A1* | 12/2008 | Wagner ............... C08G 18/092 522/107 |
| 2012/0101210 A1 | 4/2012 | Nennemann et al. |

FOREIGN PATENT DOCUMENTS

| DE | 1954093 A1 | 6/1970 |
| DE | 1670666 A1 | 7/1971 |
| DE | 2414413 A1 | 10/1975 |
| DE | 2452532 A1 | 5/1976 |
| DE | 2641380 A1 | 3/1978 |
| DE | 3700209 A1 | 7/1988 |
| DE | 3900053 A1 | 7/1990 |
| DE | 3928503 A1 | 3/1991 |
| DE | 102005057682 A1 | 6/2007 |
| EP | 0003765 A1 | 9/1979 |
| EP | 0330966 A2 | 9/1989 |
| EP | 0336205 A2 | 10/1989 |
| EP | 0339396 A1 | 11/1989 |
| EP | 0798299 A1 | 10/1997 |
| EP | 0959087 A1 | 11/1999 |
| EP | 3045485 A1 | 7/2016 |
| EP | 3527596 B1 | 1/2021 |
| EP | 3560975 B1 | 4/2021 |
| WO | 0188006 A1 | 11/2001 |
| WO | 2009010469 A | 1/2009 |
| WO | 2016146579 A1 | 9/2016 |
| WO | 2018/070371 A1 | 4/2018 |

OTHER PUBLICATIONS

J. Prakt. Chem. 336 (1994): 185-200.
Ullmanns Encyclopadie der technischen Chemie, 4th ed., vol. 19, Verlag Chemie, Weinheim, p. 31-38.
International Search Report, PCT/EP2019/060291, dated Jul. 8, 2019, Authorized officer: Ralf Buestrich.
Sigma Aldrich, Product Specification for CAPS, CAS No. 1135-40-6.
YongZhou ShengYe Organic Technology Co., Ltd., Product Specification for 3-Cyclohexylaminopropanesulfonic Acid (CAPS), CAS No. 1135-40-6, Jul. 22, 2015.
Peilin, Xu et al, Handbook of Polyurethane Materials, Aug. 2002.
R. J Butcher et al. "3-Cyclohexylaminopropane-1-sulfonic acid hemi-hydrate", Acta Cryst (2006). E62, pp. 3768-3770.

(Continued)

*Primary Examiner* — Christopher M Rodd
(74) *Attorney, Agent, or Firm* — John E. Mrozinski, Jr.

(57) ABSTRACT

The invention relates to a process for producing polyisocyanates containing sulfonate groups, the products obtainable or obtained by said process and also to the use thereof as starting component for producing polyurethane plastics. The invention further relates to coating compositions comprising polyisocyanates containing sulfonate groups and also to the substrates coated with said coating compositions.

13 Claims, No Drawings

(56) References Cited

OTHER PUBLICATIONS

Rompp Lexiton Chemie Band 3 H-L, 10. Auflage (1997); Thieme Verlag, Stuttgart, Seiten 1988-1999.
Abstract from Wikipedia "Isocyanate" retrieved from http://en.wikipedia.org/wiki/Isocyanate.
Certificate of analysis for commercial products CAPS-PRODUCT.
Abstract from the Website Santa Cruz Biotechnology "About us" retrieved from http://www.scbt.com/about-us.
Abstract from the Website Santa Cruz Biotechnology "CABS" retrieved from http://www.scbt.eom/de/p/cabs-161308-34-5.

* cited by examiner

IONICALLY HYDROPHILIZED POLYISOCYANATES, WATER CONTENT

CROSS REFERENCE TO RELATED APPLICATIONS

This application is a national stage application under 35 U.S.C. § 371 of PCT/EP2019/060291, filed Apr. 23, 2019, which claims benefit of European Application No. 18169338.3, filed Apr. 25, 2018, both of which are incorporated herein by reference in their entireties.

FIELD OF THE INVENTION

The invention relates to a process for producing polyisocyanates containing sulfonate groups, to the polyisocyanates containing sulfonate groups obtainable or obtained by said process and to the use of these for producing polyurethane plastics. The invention further relates to coating compositions comprising the polyisocyanates containing sulfonate groups and also to the substrates coated with said coating compositions.

BACKGROUND OF THE INVENTION

Aqueous coating systems are nowadays firmly established for various fields of application as an eco-friendly alternative to solvent-borne coating compositions. In this case, hydrophilically modified polyisocyanates play a particular role as raw material for qualitatively high-value aqueous coatings since, as water-dispersible crosslinker components, they enable the formulation of aqueous two-component polyurethane (2K-PUR) coatings.

A very simple method for producing water-dispersible polyisocyanates is, for example, the partial reaction of hydrophobic polyisocyanates with hydrophilic polyether alcohols (see e.g. EP-A 0 959 087, page 2, lines 25-46). However, polyether-modified polyisocyanates have the principal disadvantage that the high polyether content required for sufficient dispersibility for use as crosslinker in aqueous 2K-PUR coatings imparts permanent hydrophilicity to the coatings obtained.

To circumvent this disadvantage, it has already been attempted to produce hydrophilically modified self-dispersible polyisocyanates by incorporation of ionic groups, particularly sulfonate groups.

WO 2009/010469 describes the use of aromatic sulfonic acids bearing exactly one primary or secondary amino group and having a specific substitution pattern, in combination with monofunctional polyether alcohols, for hydrophilization of di- or polyisocyanates.

According to the teaching of WO 2001/88006, hydrophilized polyisocyanates can be obtained by reacting any polyisocyanates with 2-(cyclohexylamino)ethanesulfonic acid (CHES) or 3-(cyclohexylamino)propanesulfonic acid (CAPS) which, as crosslinkers in aqueous coating systems, result in coatings with high hardness and excellent solvent and chemical resistance.

EP 3 045 485 A1 describes the use of further aminopropane-, aminobutane- and/or aminoisobutanesulfonic acids, substituted by cycloaliphatics on the nitrogen, as hydrophilizing agents for polyisocyanates.

The aminosulfonic acids mentioned in these publications are generally present as zwitterionic compounds having high melting points and are insoluble or at least very sparingly soluble in polyisocyanates and also organic solvents. Their complete reaction with polyisocyanates therefore generally requires very long reaction times even at high temperatures.

Under these conditions—long reaction time and/or high temperature—sulfonic acid groups react in the presence of dehydrating compounds such as isocyanates, but increasingly also with each other, to give sulfonic acid anhydrides or with isocyanate groups to give mixed anhydrides of sulfonic acids and carbamic acids, so-called carbamoyl sulfonates. In the processes described above for producing polyisocyanate crosslinkers containing sulfonate groups, these secondary reactions reduce the number of acid groups imparting hydrophilicity and thus reduce the emulsifiability of the reaction products.

However, to formulate aqueous two-component polyurethane coatings of highest quality, polyisocyanate crosslinkers are required straight from the market which have high hydrophilicity and can be readily incorporated into the aqueous phase. The aim of an effective production process must therefore be to find milder reaction conditions for the reaction of aminosulfonic acids with polyisocyanates in order to suppress as far as possible the secondary reactions described above.

DETAILED DESCRIPTION OF THE INVENTION

The object of the present invention was to provide a novel process for producing polyisocyanates containing sulfonate groups which, at a given temperature, requires shorter reaction times than the processes known to date and thus affords products which, compared to the polyisocyanates containing sulfonate groups produced by the processes of the prior art, are distinguished by significantly improved dispersibility.

This object could now be achieved with the polyisocyanates containing sulfonate groups and the method for the production thereof described in more detail below. The present invention is based on the surprising observation that the reaction of polyisocyanates with aminosulfonic acids and tertiary neutralizing amines to give polyisocyanates containing sulfonate groups proceeds significantly more rapidly if the aminosulfonic acids used comprise a defined minimum content of water. This was surprising, since in polyurethane chemistry, to avoid cloudiness due to urea formation due to the isocyanate/water reaction, generally raw materials that are as anhydrous as possible are used. For polyurethane coating raw materials, the water content of which is specified at max. 500 ppm, terms such as "urethane grade" or "PU quality" have become established on the market, although in practice even water contents of significantly below 500 ppm are usually aimed for and achieved. Despite the use of water-containing aminosulfonic acids, the hydrophilic polyisocyanates obtainable by the process according to the invention are completely clear and free of polyurea precipitations and surprisingly exhibit a markedly improved emulsifiability in aqueous systems.

The present invention relates to a process for producing polyisocyanates containing sulfonate groups, comprising a reaction of A) at least one polyisocyanate component with B) at least one aminosulfonic acid comprising at least one amino group and at least one sulfonic acid group, and optionally C) at least one non-ionic hydrophilic or hydrophobic organic compound comprising at least one group reactive to isocyanates, in the presence of D) at least one tertiary amine and optionally in the presence of E) other auxiliaries and additives characterized in that the aminosulfonic acid B) has a water content of 0.05 to 1.5% by weight.

The invention also relates to the polyisocyanates containing sulfonate groups obtainable or obtained by this process and also to the use thereof as starting components for the production of polyurethane plastics, particularly as crosslinkers for water-soluble or water-dispersible paint binders or paint binder components, having groups reactive to isocyanate groups, in the production of coatings using aqueous coating compositions based on such binders or binder components.

In the present case, the water content of aminosulfonic acid B) is determined by volumetric titration according to Karl Fischer in accordance with DIN 53715 (created in accordance with DIN 51777 Part 1 (1973 edition)). The measurement range of this method is from 0.01 to 99% by weight. The water content of aminosulfonic acid B) specified in % by weight is based on the total amount of aminosulfonic acid B) used.

According to the invention the terms "comprising" or "containing" preferably mean "consisting essentially of" and particularly preferably mean "consisting of".

Starting compounds A) for the process according to the invention are any diisocyanates and/or polyisocyanates having aliphatically, cycloaliphatically, araliphatically and/or aromatically bonded isocyanate groups.

Suitable diisocyanates A) are any diisocyanates accessible in various ways, for example by phosgenation in the liquid or gas phase or by a phosgene-free route, such as for example by thermal urethane cleavage. Preferred diisocyanates are those from the molecular weight range of 140 to 400 having aliphatically, cycloaliphatically, araliphatically and/or aromatically bonded isocyanate groups, such as for example 1,4-diisocyanatobutane, 1,5-diisocyanatopentane (PDI), 1,6-diisocyanatohexane (HDI), 2-methyl-1,5-diisocyanatopentane, 1,5-diisocyanato-2,2-dimethylpentane, 2,2,4- or 2,4,4-trimethyl-1,6-diisocyanatohexane, 1,10-diisocyanatodecane, 1,3- and 1,4-diisocyanatocyclohexane, 1,3- and 1,4-bis(isocyanatomethyl)cyclohexane, 1-isocyanato-3,3,5-trimethyl-5-isocyanatomethylcyclohexane (isophorone diisocyanate, IPDI), 4,4'-diisocyanatodicyclohexylmethane, 1-isocyanato-1-methyl-4(3)isocyanatomethylcyclohexane, bis(isocyanatomethyl)norbornane, 1,3- and 1,4-bis(2-isocyanatoprop-2-yl)benzene (TMXDI), 2,4- and 2,6-diisocyanatotoluene (TDI), 2,4'- and 4,4'-diisocyanatodiphenylmethane (MDI), 1,5-diisocyanatonaphthalene or any mixtures of such diisocyanates.

Suitable polyisocyanates A) are any polyisocyanates having uretdione, isocyanurate, allophanate, biuret, iminooxadiazinedione and/or oxadiazinetrione structure, produced by modification of simple aliphatic, cycloaliphatic, araliphatic and/or aromatic diisocyanates, for example those of the type mentioned above, as described for example in J. Prakt. Chem. 336 (1994) 185-200, in DE-A 1 670 666, DE-A 1 954 093, DE-A 2 414 413, DE-A 2 452 532, DE-A 2 641 380, DE-A 3 700 209, DE-A 3 900 053 and DE-A 3 928 503 or in EP-A 0 336 205, EP-A 0 339 396 and EP-A 0 798 299 described for example or by mixtures of any such polyisocyanates. In the course of production of these polyisocyanates, the actual modification reaction is generally followed by a further process step for removing the unreacted excess monomeric diisocyanates. The monomers are removed by processes known per se, preferably by thin-film distillation under vacuum or by extraction with suitable solvents inert to isocyanate groups, for example aliphatic or cycloaliphatic hydrocarbons such as pentane, hexane, heptane, cyclopentane or cyclohexane.

In the process according to the invention, polyisocyanates of the type mentioned are preferably used as starting component A) having a content of monomeric diisocyanates of less than 1% by weight, preferably less than 0.5% by weight, particularly preferably less than 0.3% by weight. The residual monomer contents are determined in accordance with DIN EN ISO 10283:2007-11 by gas chromatography using an internal standard.

Particularly preferred polyisocyanates A) for the process according to the invention are those of the type mentioned having exclusively aliphatically and/or cycloaliphatically bonded isocyanate groups.

Especially preferred polyisocyanates A) are those based on PDI, HDI, IPDI and/or 4,4'-diisocyanatodicyclohexylmethane.

The polyisocyanates A) mentioned above as suitable, preferred, particularly preferred and especially preferred preferably comprise isocyanurate structures and have an average NCO functionality of 2.3 to 5.0, preferably of 2.5 to 4.5, and a content of isocyanate groups of 6.0 to 26.0% by weight, preferably of 8.0 to 25.0% by weight, particularly preferably 10.0 to 24.0% by weight.

Starting compounds B) for the process according to the invention are any organic compounds bearing at least one amino group and at least one sulfonic acid group and have a water content of 0.05 to 1.5% by weight, and any mixtures of such compounds.

Amino-functional compounds suitable as starting component B) are, for example, substituted aromatic sulfonic acids, which may bear up to three sulfonic acid groups and comprise up to three, preferably up to two, particularly preferably precisely one primary or secondary, especially preferably precisely one primary amino group, wherein the positions on the aromatic ring in the position ortho to the amino group are unsubstituted.

These are preferably substituted aromatic sulfonic acids of the general formula (I)

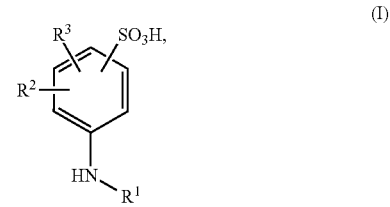

in which $R^1$, $R^2$ and $R^3$ are each independently identical or different radicals and denote hydrogen or saturated or unsaturated, linear or branched, aliphatic, cycloaliphatic, araliphatic or aromatic organic radicals, which may additionally comprise heteroatoms in the chain, wherein $R^2$ and $R^3$ may together also form a ring, preferably a fused aromatic ring, in combination with each other, with the proviso that at least one of the radicals $R^2$ and $R^3$ is not hydrogen.

Aliphatic or araliphatic radicals $R^1$, $R^2$ and $R^3$ in formula (I) are preferably those having 1 to 18 carbon atoms such as for example a methyl, ethyl, propyl, isopropyl, n-butyl, sec-butyl, tert-butyl, pentyl, hexyl, heptyl, octyl, 2-ethylhexyl, 2,4,4-trimethylpentyl, decyl, dodecyl, tetradecyl, heptadecyl, octadecyl, 1,1-dimethylpropyl, 1,1-dimethylbutyl, 1,1,3,3-tetramethylbutyl, benzyl, 1-phenylethyl, 2-phenylethyl, α,α-dimethylbenzyl, benzhydryl, p-tolylmethyl, 1-(p-butylphenyl)ethyl, p-chlorobenzyl, 2,4-dichlorobenzyl, p-methoxybenzyl, m-ethoxybenzyl, 2-cyanoethyl, 2-cyanopropyl, 2-methoxycarbonethyl, 2-ethoxycarbonylethyl, 2-butoxycarbonylpropyl, 1,2-di(methoxycarbonyl)ethyl, 2-methoxy ethyl, 2-ethoxyethyl, 2-butoxyethyl, diethoxymethyl, diethoxyethyl, 1,3-dioxolan-2-yl, 1,3-dioxan-2-yl, 2-methyl-1,3-dioxolan-2-yl-, 4-methyl-1,3-dioxolan-2-yl, 2-isopropoxyethyl, 2-butoxypropyl, 2-octyloxyethyl, chloromethyl, 2-chloroethyl, trichloromethyl, trifluoromethyl, 1,1-dimethyl-2-chloroethyl, 2-methoxyisopropyl, butylthiomethyl, 2-dodecylthioethyl, 2-phenylthioethyl, 2,2,2-trifluoroethyl, 2-phenoxyethyl, 2-phenoxypropyl, 3-phenoxypropyl, 4-phenoxybutyl, 6-phenoxyhexyl, 2-methoxyethyl, 2-methoxypropyl, 3-methoxypropyl, 4-methoxybutyl, 6-methoxyhexyl, 2-ethoxypropyl, 3-ethoxypropyl, 4-ethoxybutyl or 6-ethoxyhexyl radical.

Cycloaliphatic radicals $R^1$, $R^2$ and $R^3$ in formula (I) are preferably those having 5 to 12 carbon atoms such as, for example a cyclopentyl, cyclohexyl, cyclooctyl, cyclododecyl, methylcyclopentyl, dimethylcyclopentyl, methylcyclohexyl, dimethylcyclohexyl, diethylcyclohexyl, butylcyclohexyl, methoxycyclohexyl, dimethoxycyclohexyl, diethoxycyclohexyl, butylthiocyclohexyl, chlorocyclohexyl, dichlorocyclohexyl, dichlorocyclopentyl radical and also saturated or unsaturated bicyclic systems such as, for example a norbornyl or a norbornenyl radical.

Aromatic radicals $R^1$, $R^2$ and $R^3$ in formula (I) are preferably those having 6 to 12 carbon atoms such as, for example a phenyl, tolyl, xylyl, o-naphthyl, β-naphthyl, 4-diphenylyl, chlorophenyl, dichlorophenyl, trichlorophenyl, difluorophenyl, methylphenyl, dimethylphenyl, trimethylphenyl, ethylphenyl, diethylphenyl, isopropylphenyl, tert-butylphenyl, dodecylphenyl, methoxyphenyl, dimethoxyphenyl, ethoxyphenyl, hexyloxyphenyl, methylnaphthyl, isopropylnaphthyl, chloronaphthyl, ethoxynaphthyl, 2,6-dimethylphenyl, 2,4,6-trimethylphenyl, 2,6-dimethoxyphenyl, 2,6-dichlorophenyl, 4-bromophenyl, 2- or 4-nitrophenyl, 2,4- or 2,6-dinitrophenyl, 4-dimethylaminophenyl, 4-acetylphenyl, methoxyethylphenyl or ethoxymethylphenyl radical.

If the radicals $R^2$ and $R^3$ in formula (I) together form a ring, $R^2$ and $R^3$ are preferably a butyl-1,4-ylene chain or particularly preferably a 1,3-butadien-1,4-ylene chain, which means that the aromatic sulfonic acids in this case preferably have a tetrahydronaphthalene or particularly preferably a naphthalene structure.

The radical $R^1$ is particularly preferably hydrogen, a methyl, ethyl, n-propyl, isopropyl, tert-butyl, cyclopentyl or cyclohexyl radical, especially preferably hydrogen.

The radicals $R^2$ and $R^3$ are particularly preferably each independently hydrogen, a methyl, ethyl, isopropyl, tert-butyl, hexyl, octyl, nonyl, decyl, dodecyl, phenyl or naphthyl radical, especially preferably hydrogen and/or a methyl group. In this case, preferably one of the radicals $R^2$ and $R^3$ is hydrogen while the other is other than hydrogen.

The sulfonic acid group in formula (I), as well as the substituents $R^2$ and $R^3$, is in the para- or meta-position on the aromatic ring based on the primary or secondary amino group, the sulfonic acid group preferably in this case being in the meta-position.

Suitable aromatic aminosulfonic acids of the general formula (I) are, for example, 4-aminotoluene-2-sulfonic acid, 5-aminotoluene-2-sulfonic acid or 2-aminonaphthalene-4-sulfonic acid, particular preference being given to 4-aminotoluene-2-sulfonic acid.

Further starting compounds B) for the process according to the invention are also amino-functional sulfonic acids of the general formula (II)

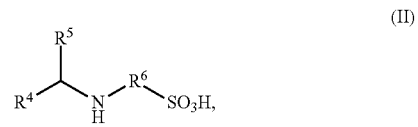

in which $R^4$ and $R^5$ are each independently identical or different radicals and are hydrogen or saturated or unsaturated, linear or branched, aliphatic or cycloaliphatic or aromatic organic radicals having 1 to 18 carbon atoms, which are substituted or unsubstituted and/or comprise heteroatoms in the chain, wherein $R^4$ and $R^5$, also in combination with each other and optionally with one further nitrogen atom or one oxygen atom, may form cycloaliphatic or heterocyclic rings having 3 to 8 carbon atoms, which may optionally be further substituted, and $R^6$ is a linear or branched aliphatic radical having 2 to 6 carbon atoms.

In the general formula (II), $R^4$ and $R^5$ are each independently preferably saturated, linear or branched, aliphatic or cycloaliphatic organic radicals having 1 to 8 carbon atoms, which may also form cycloaliphatic rings in combination with each other, and $R^6$ is a linear or branched aliphatic radical having 2 to 4 carbon atoms.

Suitable aminosulfonic acids of the general formula (II) are, for example, 2-aminoethanesulfonic acid, 3-aminopropane-1-sulfonic acid, 4-aminobutane-1-sulfonic acid, 3-aminobutane-1-sulfonic acid, 3-amino-2-methylpropane-1-sulfonic acid, 4-aminobutane-2-sulfonic acid, 2-methylaminoethane-1-sulfonic acid, 2-ethylaminoethane-1-sulfonic acid, 2-propylaminoethane-1-sulfonic acid, 2-isopropylaminoethane-1-sulfonic acid, 2-n-butylaminoethane-1-sulfonic acid, 2-(tert-butyl)aminoethane-1-sulfonic acid, 2-pentylaminoethane-1-sulfonic acid, 2-hexylaminoethane-1-sulfonic acid, 2-octylaminoethane-1-sulfonic acid, 2-anilinoethane-1-sulfonic acid, 2-cyclopropylaminoethane-1-sulfonic acid, 2-cyclobutylaminoethane-1-sulfonic acid, 2-cyclopentylaminoethane-1-sulfonic acid, 2-cyclohexylaminoethane-1-sulfonic acid, the isomeric 2-(methylcyclohexyl)aminoethane-1-sulfonic acids, 2-(2,3-dimethylcyclohexyl)aminoethane-1-sulfonic acid, 2-(3,3,5-trimethylcyclohexyl)aminoethane-1-sulfonic acid, 2-(4-tert-butylcyclohexyl)aminoethane-1-sulfonic acid, 2-cycloheptylaminoethane-1-sulfonic acid, 2-cyclooctylaminoethane-1-sulfonic acid, 2-(2-norbornyl)aminoethane-1-sulfonic acid, 2-(1-adamantyl)aminoethane-1-sulfonic acid, 2-(3,5-dimethyl-1-adamantyl)aminoethane-1-sulfonic acid, 3-methylaminopropane-1-sulfonic acid, 3-ethylaminopropane-1-sulfonic acid, 3-propylaminopropane-1-sulfonic acid, 3-isopropylaminopropane-1-sulfonic acid, 3-n-butylaminopropane-1-sulfonic acid, 3-(tert-butyl)aminopropane-1-sulfonic acid, 3-pentylaminopropane-1-sulfonic acid, 3-hexylaminopropane-1-sulfonicacid, 3-octylaminopropane-1-sulfonic acid, 3-anilinopropane-1-sulfonic acid, 3-cyclopropylaminopropane-1-sulfonic acid, 3-cyclobutylaminopropane-1-sulfonic acid, 3-cyclopentylaminopropane-1-sulfonic acid, 3-cyclohexylaminopropane-1-sulfonic acid, the isomeric 3-(methylcyclohexyl)aminopropane-1-sulfonic acids, 3-(2,3-dimethylcyclohexyl)aminopropane-1-sulfonic acid, 3-(3,3,5-trimethylcyclohexyl)aminopropane-1-sulfonic acid, 3-(4-tert-butylcyclohexyl)aminopropane-1- sulfonic acid, 3-cycloheptylaminopropane-1-sulfonic acid, 3-cyclooctylaminopropane-1-sulfonic acid, 3-(2-norbornyl) aminopropane-1-sulfonic acid, 3-(1-adamantyl)aminopropane-1-sulfonic acid, 3-(3,5-dimethyl-1-adamantyl)aminopropane-1-sulfonicacid, 3-methylaminobutane-1-sulfonic acid, 3-ethylaminobutane-1-sulfonic acid, 3-propylaminobutane-1-sulfonic acid, 3-isopropylaminobutane-1-sulfonic acid, 3-n-butylaminobutane-1-sulfonic acid, 3-(tert-butyl)aminobutane-1-sulfonic acid, 3-pentylaminobutane-1-sulfonic acid, 3-hexylaminobutane-1-sulfonic acid, 3-octylaminobutane-1-sulfonic acid, 3-anilinobutane-1-sulfonic acid, 3-cyclopropylaminobutane-1-sulfonic acid, 3-cyclobutylaminobutane-1-sulfonic acid, 3-cyclopentylaminobutane-1-sulfonic acid, 3-cyclohexylaminobutane-1-sulfonic acid, the isomeric 3-(methylcyclohexyl)aminobutane-1-sulfonic acids, 3-(2,3-dimethylcyclohexyl)aminobutane-1-sulfonic acid, 3-(3,3,5-trimethylcyclohexyl aminobutane-1-sulfonic acid, 3-(4-tert-butylcyclohexyl)aminobutane-1-sulfonic acid, 3-cycloheptylaminobutane-1-sulfonic acid, 3-cyclooctylaminobutane-1-sulfonic acid, 3-(2-norbornyl)aminobutane-1-sulfonic acid, 3-(1-adamantyl)aminobutane-1-sulfonic acid, 3-(3,5-dimethyl-1-adamantyl)aminobutane-1-sulfonic acid, 4-methylaminobutane-1-sulfonic acid, 4-ethylaminobutane-1-sulfonic acid, 4-propylaminobutane-1-sulfonic acid, 4-isopropylaminobutane-1-sulfonic acid, 4-n-butylaminobutane-1-sulfonic acid, 4-(tert-butyl)aminobutane-1-sulfonic acid, 4-pentylaminobutane-1-sulfonic acid, 4-hexylaminobutane-1-sulfonic acid, 4-octylaminobutane-1-sulfonic acid, 4-anilinobutane-1-sulfonic acid, 4-cyclopropylaminobutane-1-sulfonic acid, 4-cyclobutylaminobutane-1-sulfonic acid, 4-cyclopentylaminobutane-1-sulfonic acid, 4-cyclohexylaminobutane-1-sulfonic acid, the isomeric 4-(methylcyclohexyl)aminobutane-1-sulfonic acids, 4-(2,3-dimethylcyclohexyl)aminobutane-1-sulfonic acid, 4-(3,3,5-trimethylcyclohexylaminobutane-1-sulfonic acid, 4-(4-tert-butylcyclohexyl)aminobutane-1-sulfonic acid, 4-cycloheptylaminobutane-1-sulfonic acid, 4-cyclooctylaminobutane-1-sulfonic acid, 4-(2-norbornyl)aminobutane-1-sulfonic acid, 4-(1-adamantyl)aminobutane-1-sulfonic acid, 4-(3,5-dimethyl-1-adamantyl)aminobutane-1-sulfonic acid, 3-methylamino-2-methylpropane-1-sulfonic acid, 3-ethylamino-2-methylpropane-1-sulfonic acid, 3-propylamino-2-methylpropane-1-sulfonic acid, 3-isopropylamino-2-methylpropane-1-sulfonic acid, 3-n-butylamino-2-methylpropane-1-sulfonic acid, 3-(tert-butyl)amino-2-methylpropane-1-sulfonic acid, 3-pentylamino-2-methylpropane-1-sulfonic acid, 3-hexylamino-2-methylpropane-1-sulfonic acid, 3-octylamino-2-methylpropane-1-sulfonic acid, 3-anilino-2-methylpropane-1-sulfonic acid, 3-cyclopropylamino-2-methylpropane-1-sulfonic acid, 3-cyclobutylamino-2-methylpropane-1-sulfonic acid, 3-cyclopentylamino-2-methylpropane-1-sulfonic acid, 3-cyclohexylamino-2-methylpropane-1-sulfonic acid, the isomeric 3-(methylcyclohexyl)amino-2-methylpropane-1-sulfonic acids, 3-(2,3-dimethylcyclohexyl)amino-2-methylpropane-1-sulfonic acid, 3-(3,3,5-trimethyl cyclohexylamino-2-methylpropane-1-sulfonic acid, 3-(4-tert-butylcyclohexyl)amino-2-methylpropane-1-sulfonic acid, 3-cycloheptylamino-2-methylpropane-1-sulfonic acid, 3-cyclooctylamino-2-methylpropane-1-sulfonic acid, 3-(2-norbornyl)amino-2-methylpropane-1-sulfonic acid, 3-(1-adamantyl)amino-2-methylpropane-1-sulfonic acid, 3-(3,5-dimethyl-1-adamantyl)amino-2-methylpropane-1-sulfonic acid, 3-methylaminobutane-2-sulfonic acid, 3-ethylaminobutane-2-sulfonic acid, 3-propylaminobutane-2-sulfonic acid, 3-isopropylaminobutane-2-sulfonic acid, 3-n-butylaminobutane-2-sulfonic acid, 3-(tert-butyl)aminobutane-2-sulfonic acid, 3-pentylaminobutane-2-sulfonic acid, 3-hexylaminobutane-2-sulfonic acid, 3-octylaminobutane-2-sulfonic acid, 3-anilinobutane-2-sulfonic acid, 3-cyclopropylaminobutane-2-sulfonic acid, 3-cyclobutylaminobutane-2-sulfonic acid, 3-cyclopentylaminobutane-2-sulfonic acid, 3-cyclohexylaminobutane-2-sulfonic acid, the isomeric 3-(methylcyclohexyl)aminobutane-2-sulfonic acids, 3-(2,3-dimethylcyclohexyl) aminobutane-2-sulfonic acid, 3-(3,3,5-trimethylcyclohexyl) aminobutane-2-sulfonic acid, 3-(4-tert-butylcyclohexyl) aminobutane-2-sulfonic acid, 3-cycloheptylaminobutane-2-sulfonic acid, 3-cyclooctylaminobutane-2-sulfonic acid, 3-(2-norbornyl)aminobutane-2-sulfonic acid, 3-(1-adamantyl)amino-2-sulfonic acid and 3-(3,5-dimethyl-1-adamantyl) aminobutane-2-sulfonic acid.

Particularly preferred aminosulfonic acids B) for the process according to the invention are those of the general formula (II), in which neither of the radicals $R^4$ and $R^5$ are hydrogen.

Very particularly preferred aminosulfonic acids B) are 2-isopropylaminoethane-1-sulfonic acid, 3-isopropylaminopropane-1-sulfonic acid, 4-isopropylaminobutane-1-sulfonic acid, 2-cyclohexylaminoethane-1-sulfonic acid, 3-cyclohexylaminopropane-1-sulfonic acid and 4-cyclohexylaminobutane-1-sulfonic acid.

In the process according to the invention, the aminosulfonic acids B) are preferably used in an amount of 0.3 to 25.0% by weight, particularly preferably 0.5 to 15.0% by weight, especially preferably 1.0 to 10.0% by weight, based on the total weight of the components A) and B).

Essential to the invention in this case is that aminosulfonic acids B) are used having a water content of 0.05 to 1.5% by weight, preferably 0.1 to 1.0% by weight, particularly preferably 0.15 to 0.9% by weight, especially preferably 0.2 to 0.6% by weight.

The water may be introduced into the aminosulfonic acids B) by any desired route and these routes may also complement one another in order to achieve the desired total amount of water. For example, the amount of water mentioned may already be present in the aminosulfonic acids B) due to the production process. In the case that the aminosulfonic acids B) comprise more than 1.5% water due to the production process, the water content can be adjusted to a value within the range claimed according to the invention, for example by targeted drying, for example at elevated temperature and/or under vacuum. In addition, it is also self-evidently possible to adjust the water content of the aminosulfonic acids B) by direct addition of appropriate amounts of water.

Starting compounds C) for the process according to the invention are any non-ionic hydrophilic or hydrophobic compounds which comprise at least one group that is reactive to isocyanates. The compounds C) are different to B). In other words, the starting component C) comprises at least one non-ionic hydrophilic organic compound comprising at least one group reactive to isocyanates, and/or at least one hydrophobic organic compound comprising at least one group reactive to isocyanates.

Suitable non-ionic hydrophilic compounds C) are, for example, monohydric or polyhydric polyalkylene oxide polyether alcohols having a statistical average of 5 to 50 ethylene oxide units per molecule, as obtainable in a manner known per se by alkoxylation of suitable starter molecules (for example see Ullmanns Encyclopädie der technischen Chemie, 4th edition, volume 19, Verlag Chemie, Weinheim pp. 31-38). Starter molecules of this kind may be, for example, any desired monohydric or polyhydric alcohols of the molecular weight range 32 to 300, such as for example methanol, ethanol, n-propanol, isopropanol, n-butanol, isobutanol, sec-butanol, the isomeric pentanols, hexanols, octanols and nonanols, n-decanol, n-dodecanol, n-tetradecanol, n-hexadecanol, n-octadecanol, cyclohexanol, the isomeric methylcyclohexanols, hydroxymethylcyclohexane, 3-methyl-3-hydroxymethyloxetane, benzyl alcohol, phenol, the isomeric cresols, octylphenols, nonylphenols and naphthols, furfuryl alcohol, tetrahydrofurfuryl alcohol, 1,2-ethanediol, 1,2- and 1,3-propanediol, the isomeric butanediols, pentanediols, hexanediols, heptanediols and octanediols, 1,2- and 1,4-cyclohexanediol, 1,4-cyclohexanedimethanol, 4,4'-(1-methylethylidene)biscyclohexanol, 1,2,3-propanetriol, 1,1,1-trimethylolethane, 1,2,6-hexanetriol, 1,1,1-trimethylolpropane, 2,2-bis(hydroxymethyl)-1,3-propanediol or 1,3,5-tris(2-hydroxyethyl)isocyanurate.

Alkylene oxides suitable for the alkoxylation reaction are especially ethylene oxide and propylene oxide and these may be employed in the alkoxylation reaction in any desired sequence or else in admixture. Suitable polyether alcohols are either pure polyethylene oxide polyether alcohols or mixed polyalkylene oxide polyethers, the alkylene oxide units of which consist to an extent of at least 70 mol %, preferably to an extent of at least 80 mol %, of ethylene oxide units.

Preferred polyalkylene oxide polyether alcohols C) are those which have been produced using the aforementioned monoalcohols of the molecular weight range 32 to 150 as starter molecules. Particularly preferred polyether alcohols are pure polyethylene glycol monomethyl ether alcohols having a statistical average of 5 to 50, especially preferably 5 to 25 ethylene oxide units.

Non-ionic hydrophilic compounds C) in the process according to the invention are used, if at all, in amounts to an extent of up to 30% by weight, preferably up to 25% by weight, particularly preferably up to 20% by weight, based on the starting polyisocyanate A).

Suitable hydrophobic compounds C) are, for example, aliphatic alcohols or fatty acid ester alcohols having in each case at least 8 carbon atoms.

Suitable aliphatic hydrophobic alcohols are, for example, 1-octanol, 2-ethyl-1-hexanol, the isomeric nonanols, decanols, undecanols, dodecanols, tridecanols, tetradecanols, pentadecanols, hexadecanols and 3-phenyl-2-propenol (cinnamyl alcohol) and also hydrophobic polyalkylene oxide alcohols started by these alcohols, the alkylene oxide units of which consist to an extent of at least 80 mol %, preferably at least 90 mol %, particularly preferably exclusively of propylene oxide units.

Suitable fatty acid ester alcohols C) are, for example, esterification products of hydroxy-functional fatty acids, such as for example hydroxyacetic acid, 3-hydroxypropionic acid, hydroxybutyric acid, 2-hydroxysuccinic acid (malic acid), 2,3-dihydroxysuccinic acid (tartaric acid), 2-hydroxy-1,2,3-propanetricarboxylic acid (citric acid), hydroxystearic acid, ricinoleic acid, salicylic acid and mandelic acid, with alcohols such as for example methanol, ethanol, n-propanol, isopropanol, n-butanol, isobutanol, sec-butanol, the isomeric pentanols, hexanols, octanols and nonanols, n-decanol or n-dodecanol, in which the sum total of carbon atoms of the fatty acid and esterification alcohol is at least 8.

Hydrophobic compounds C) in the process according to the invention are used, if at all, in amounts to an extent of up to 30% by weight, preferably up to 20% by weight, particularly preferably up to 10% by weight, based on the starting polyisocyanate A).

The reaction of the polyisocyanate component A) with the aminosulfonic acids B) and optionally further non-ionic hydrophilic or hydrophobic compounds C) in the process according to the invention takes place in the presence of at least one tertiary amine D), which serves to neutralize the sulfonic acid groups of the starting component B).

Suitable tertiary amines D) are, for example, tertiary monoamines such as, for example, trimethylamine, triethylamine, tripropylamine, tributylamine, N,N-dimethylethylamine, N,N-dimethylpropylamine, N,N-dimethylisopropylamine, N,N-dimethylbutylamine, N,N-dimethylisobutylamine, N,N-dimethyloctylamine, N,N-dimethyl-2-ethylhexylamine, N,N-dimethyllaurylamine, N,N-diethylmethylamine, N,N-diethylpropylamine, N,N-diethylbutylamine, N,N-diethylhexylamine, N,N-diethyloctylamine, N,N-diethyl-2-ethylhexylamine, N,N-diethyllaurylamine, N,N-diisopropylmethylamine, N,N-diisopropylethylamine, N,N-diisopropylbutylamine, N,N-diisopropyl-2-ethylhexylamine, N,N-dioctylmethylamine, N,N-dimethylallylamine, N,N-dimethylbenzylamine, N,N-diethylbenzylamine, N,N-dibenzylmethylamine, tribenzylamine, N,N-dimethyl-4-methylbenzylamine, N,N-dimethylcyclohexylamine, N,N-diethylcyclohexylamine, N,N-dicyclohexylmethylamine, N,N-dicyclohexylethylamine, tricyclohexylamine, N-methylpyrrolidine, N-ethylpyrrolidine, N-propylpyrrolidine, N-butylpyrrolidine, N-methylpiperidine, N-ethylpiperidine, N-propylpiperidine, N-butylpiperidine, N-methylmorpholine, N-ethylmorpholine, N-propylmorpholine, N-butylmorpholine, N-sec-butylmorpholine, N-tert-butylmorpholine, N-isobutylmorpholine and quinuclidine or tertiary diamines such as, for example, 1,3-bis(dimethylamino)propane, 1,4-bis(dimethylamino)butane and N,N'-dimethylpiperazine, or any desired mixtures of such tertiary amines.

Suitable but less preferred tertiary amines D) are in addition also those which bear groups reactive to isocyanates, for example alkanolamines such as dimethylethanolamine, methyldiethanolamine or triethanolamine.

Preferred tertiary amines D) are N,N-dimethylbutylamine, N,N-dimethyl-2-ethylhexylamine, N,N-diethylmethylamine, N,N-diisopropylethylamine, N,N-diisopropyl-2-ethylhexylamine, N,N-dimethylcyclohexylamine, N,N-dicyclohexylmethylamine, N-methylpyrrolidine, N-methylpiperidine, N-ethylpiperidine, N-methylmorpholine, N-ethylmorpholine, N-isobutylmorpholine or mixtures thereof.

Particular preference is given to N,N-dimethylbutylamine, N,N-diethylmethylamine, N,N-diisopropylethylamine, N,N-dimethylcyclohexylamine, N-methylpiperidine, N-ethylmorpholine or mixtures thereof.

The neutralizing amines D) mentioned are used in the process according to the invention in those amounts which correspond to an equivalent ratio of tertiary amino groups to sulfonic acid groups of the component B) of 0.2 to 2.0, preferably 0.5 to 1.5, particularly preferably 0.95 to 1.05.

In the process according to the invention, optionally further auxiliaries and additives E) can be used such as for example antioxidants and/or catalysts.

Suitable antioxidants E) are, for example, compounds having antioxidative effect known per se from plastics chemistry such as for example preferred sterically hindered phenols and/or di- or trisubstituted phosphites.

Suitable sterically hindered phenols E) are, for example, 2,6-di-tert-butylphenol, 2,4-dimethyl-6-tert-butylphenol, 2,6-di-tert-butyl-4-methylphenol, triethylene glycol bis(3-tert-butyl-4-hydroxy-5-methylphenyl)propionate, octadecyl 3-(3,5-di-tert-butyl-4-hydroxyphenyl) propionate, pentaerythritol tetrakis(3-(3,5-di-tert-butyl-4-hydroxyphenyl) propionate), esters of 3-(3,5-di-tert-butyl-4-hydroxyphenyl) propionic acid with aliphatic branched C7- to C9-alcohols such as for example isoheptyl 3-(3,5-di-tert-butyl-4-hydroxyphenyl)propionate, isooctyl 3-(3,5-di-tert-butyl-4-hydroxyphenyl)propionate or isononyl 3-(3,5-di-tert-butyl-4-hydroxyphenylpropionate, isotridecyl 3-(3,5-di-tert-butyl-4-hydroxyphenyl)propionate, thiodiethyl bis[3-(3,5-di-tert-butyl-4-hydroxyphenyl)propionate], N,N'-hexamethylenebis(3,5-di-tert-butyl-4-hydroxyphenyl) propionamide, 1,2-bis(3,5-di-tert-butyl-4-hydroxyphenylpropionic acid) hydrazide, 2,4-di-tert-butylphenyl 4'-hydroxy-3',5'-di-tert-butylbenzoate, esters of (3,5-di-tert-butyl-4-hydroxyphenyl)methylthioacetic acid with aliphatic branched C10- to C14-alcohols, 2,2'-thiobis(4-methyl-6-tert-butylphenol), 2-methyl-4,6-bis(octylthiomethyl)phenol, 1,3,5-trimethyl-2,4,6-tris(3,5-di-tert-butyl-4-hydroxybenzyl)benzene, tris(3,5-di-tert-butyl-4-hydroxybenzyl) isocyanurate and 2,5-di-tert-amylhydroquinone, which are optionally used in combination with didodecyl 3,3'-thiodipropionate or dioctadecyl 3,3'-thiodipropionate.

Suitable phosphites E) are, for example, di- or preferably trisubstituted phosphites such as for example dibutyl phosphite and dibenzyl phosphite, triethyl phosphite and tributyl phosphite. The antioxidants E) of the phosphite type are however preferably trisubstituted phosphites in which at least one of the substituents is an optionally substituted aromatic radical having 6 to 18 carbon atoms or a linear or branched aliphatic radical having 9 to 18 carbon atoms, for example aryl phosphites such as for example triphenyl phosphite, tris(2,4-di-tert-butylphenyl) phosphite or tris (nonylphenyl) phosphite, alkyl-aryl phosphites such as for example diphenylisooctyl phosphite, diphenylisodecyl phosphite, diisodecylphenyl phosphite, diisooctyloctylphenyl phosphite, phenyl neopentyl glycol phosphite or 2,4,6-tri-tert-butylphenyl(2-butyl-2-ethyl-1,3-propanediol) phosphite, alkyl phosphites such as for example triisodecyl phosphite, trilauryl phosphite or tris(tridecyl) phosphite, or aromatic or aliphatic substituted diphosphites such as for example diisodecyl pentaerythritol diphosphite, distearyl pentaerythritol diphosphite, bis(2,4-di-tert-butylphenyl) pentaerythritol diphosphite or tetraphenyl dipropylene glycol diphosphite.

Preferred antioxidants E) for the process according to the invention are sterically hindered phenols comprising 2,6-di-tert-butyl-4-methylphenol structures, and trisubstituted phosphites bearing at least one linear or branched aliphatic substituent having 10 to 16 carbon atoms or one phenyl radical. Particularly preferred antioxidants D) are 2,6-di-tert-butyl-4-methylphenol, esters of 3-(3,5-di-tert-butyl-4-hydroxyphenyl)propionic acid with aliphatic branched C7- to C9-alcohols, octadecyl 3-(3,5-di-tert-butyl-4-hydroxyphenyl)propionate, triisodecyl phosphite, phenyldiisodecyl phospite and/or diphenylisodecyl phospite.

Especially preferred antioxidants E) for the process according to the invention are 2,6-di-tert-butyl-4-methylphenol and esters of 3-(3,5-di-tert-butyl-4-hydroxyphenyl) propionic acid with aliphatic branched C7- to C9 alcohols.

If at all, antioxidants E) are used in the process according to the invention either individually or in any desired combination with one another in amounts of 0.001 to 3.0% by weight, preferably 0.002 to 2.0% by weight, particularly preferably 0.005 to 1.0% by weight, especially preferably 0.01 to 0.5% by weight, calculated as the total amount of antioxidants used, based on the amount of starting polyisocyanate A).

The antioxidants E) can in this case be mixed in the amounts specified with one or more of the reaction partners, the polyisocyanate component A), the aminosulfonic acid B), the non-ionic hydrophilic or hydrophobic compounds C) optionally to be used and/or the tertiary amine D), prior to the start of the actual reaction. However, they can also be added to the reaction mixture at any desired time point during the metered addition of the reaction partners or thereafter, preferably at the start of the metered addition.

The antioxidant E) is added, if at all, preferably prior to the start of the reaction of the polyisocyanate component A).

To carry out the process according to the invention, the starting components A), B) and optionally C) are reacted with one another in the presence of a tertiary amine D) and optionally in the presence of other auxiliaries and additives E) at temperatures of 40 to 150° C., preferably 50 to 130° C., particularly preferably 70 to 110° C., maintaining an equivalent ratio of NCO groups to groups reactive to NCO groups of from 2:1 to 400:1, preferably from 4:1 to 250:1, preferably until the theoretically calculated NCO content is achieved, wherein the reaction course can be monitored by, for example, titrimetric determination of the NCO content. The NCO content is determined by preferably titrimetric means in accordance with DIN EN ISO 11909:2007-05.

The presence of the tertiary amine D) generally catalyzes the reaction of components A), B) and optionally C) sufficiently rapidly, but to accelerate the reaction in the process according to the invention, conventional catalysts known from polyurethane chemistry can optionally be used as further auxiliaries and additives E), for example further tert. Amines such as triethylamine, pyridine, methylpyridine, benzyldimethylamine, N,N-endoethylene piperazine, N-methylpiperidine, pentamethyldiethylenetriamine, N,N-dimethylaminocyclohexane, N,N'-dimethylpiperazine or metal salts such as iron(III) chloride, aluminum tri(ethylacetoacetate), zinc chloride, zinc(II) n-octanoate, zinc(II) 2-ethyl-1-hexanoate, zinc(II) 2-ethylcaproate, zinc(II) stearate, zinc(II) naphthenate, zinc(II) acetylacetonate, tin(II) n-octanoate, tin(II) 2-ethyl-1-hexanoate, tin(II) ethylcaproate, tin(II) laurate, tin(II) palmitate, dibutyltin(IV) oxide, dibutyltin(IV) dichloride, dibutyltin(IV) diacetate, dibutyltin(IV) dimaleate, dibutyltin(IV) dilaurate, dioctyltin (IV) diacetate, molybdenum glycolate or any mixtures of such catalysts.

These catalysts E) are used in the process according to the invention, if at all, in an amount of 0.001 to 2% by weight, preferably 0.005 to 0.5% by weight, based on the total weight of the reaction partners.

A further preferred embodiment is a process for preparing polyisocyanates containing sulfonate groups, comprising a reaction of A) at least one polyisocyanate component with
B) at least one aminosulfonic acid comprising at least one amino group and at least one sulfonic acid group, and optionally
C) at least one non-ionic hydrophilic organic compound comprising at least one group reactive to isocyanates, and/or at least one hydrophobic organic compound comprising at least one group reactive to isocyanates, in the presence of
D) at least one tertiary amine and optionally in the presence of
E) other auxiliaries and additives
characterized in that
the aminosulfonic acid B) has a water content of 0.05 to 1.5% by weight.

The water content of starting components C), D) and E) is of secondary importance for the process according to the invention. As customary for raw materials having "PU quality", it is generally below 500 ppm. It is relevant to the invention that the aminosulfonic acids B) used have a water content in the range specified above. The total water content in the starting components A), B), D), optionally C) and optionally E) comprising the reaction mixture in the process according to the invention is preferably less than 0.5% by weight, particularly preferably less than 0.2% by weight, especially preferably less than 0.1% by weight. The above reaction mixture preferably consists of the starting components A), B), D), optionally C) and optionally E) and has a total water content of less than 0.5% by weight, particularly preferably less than 0.2% by weight, especially preferably less than 0.1% by weight.

A particularly preferred embodiment is a process for preparing polyisocyanates containing sulfonate groups, comprising a reaction of A) at least one polyisocyanate component with B) at least one aminosulfonic acid comprising at least one amino group and at least one sulfonic acid group, and optionally C) at least one non-ionic hydrophilic organic compound comprising at least one group reactive to isocyanates, and/or at least one hydrophobic organic compound comprising at least one group reactive to isocyanates, in the presence of D) at least one tertiary amine and optionally in the presence of E) other auxiliaries and additives characterized in that the aminosulfonic acid B) has a water content of 0.05 to 1.5% by weight and the components A), C), D) and E) each have a water content of below 500 ppm by weight, in each case based on the respective total amount of the component used. As with all the other embodiments mentioned, it is also very particularly preferred here that the total water content in the reaction mixture comprising starting components A), B), D), optionally C) and optionally E) is less than 0.5% by weight, particularly preferably less than 0.2% by weight, especially preferably less than 0.1% by weight. The above reaction mixture preferably consists of the starting components A), B), D), optionally C) and optionally E) and has a total water content of less than 0.5% by weight, particularly preferably less than 0.2% by weight, especially preferably less than 0.1% by weight.

The process of the invention is preferably conducted without solvent. If desired, however, suitable solvents inert to the reactive groups of the starting components, in particular to isocyanate groups, can also be used. Examples of suitable solvents are the customary paint solvents which are known per se, such as, for example ethyl acetate, butyl acetate, ethylene glycol monomethyl or monoethyl ether acetate, 1-methoxy-2-propyl acetate, 3-methoxy-n-butyl acetate, acetone, 2-butanone, 4-methyl-2-pentanone, cyclohexanone, toluene, xylene, chlorobenzene, white spirit, relatively highly substituted aromatics, of the kind commercialized, for example, under the names solvent naphtha, Solvesso®, Isopar®, Nappar® (Deutsche EXXON CHEMICAL GmbH, Cologne, DE) and Shellsol® (Deutsche Shell Chemie GmbH, Eschborn, DE), carbonic esters such as dimethyl carbonate, diethyl carbonate, 1,2-ethylene carbonate and 1,2-propylene carbonate, lactones such as β-propiolactone, γ-butyrolactone, ε-caprolactone and ε-methylcaprolactone, and also solvents such as propylene glycol diacetate, diethylene glycol dimethyl ether, dipropylene glycol dimethyl ether, butyl glycol acetate, butyl diglycol acetate, 1,3-dioxolane, N-methylpyrrolidone and N-methylcaprolactam, or any desired mixtures of such solvents.

In the process according to the invention, owing to the use of aminosulfonic acids with water contents in the concentration range specified above of 0.05 to 1.5% by weight, the reaction of the reaction partners proceeds significantly more rapidly at the given reaction temperature than in analogous reaction mixtures in which aminosulfonic acids with water contents of less than 0.05 or more than 1.5% by weight are used. The process products according to the invention obtained in this case are clear polyisocyanates containing sulfonate groups, which can easily be converted into sedimentation-stable dispersions by simply stirring them into water without using high shear forces. In direct comparison to dispersions of polyisocyanates containing sulfonate groups of an analog structure, which were prepared using aminosulfonic acids with a lower or higher water content, they are characterized by a smaller average particle size which, when used as crosslinking component in aqueous coating systems, results in coatings with higher transparency and higher gloss.

In addition, when polyisocyanates are reacted with aminosulfonic acids with water contents of more than 1.5% by weight, it is very often not possible to obtain clear, transparent products. Due to increasing urea formation, cloudy highly lumpy polyisocyanate mixtures are formed which are unsuitable as crosslinking components for aqueous coating compositions.

Optionally, any further non-hydrophilized polyisocyanates, for example those of the type mentioned as suitable starting polyisocyanates A), may be added to the polyisocyanates containing sulfonate groups according to the invention prior to emulsification, whereby polyisocyanate mixtures are obtained which likewise represent polyisocyanate mixtures according to the invention, since these generally consist of mixtures of (i) polyisocyanates modified hydrophilically with sulfonate groups in accordance with the invention and (ii) unmodified polyisocyanates of the type mentioned by way of example.

In such mixtures, the polyisocyanates containing sulfonate groups according to the invention take on the function of an emulsifier for the proportion of non-hydrophilic polyisocyanates that are subsequently mixed in.

The polyisocyanate mixtures according to the invention represent valuable starting materials for producing polyurethane plastics by the isocyanate polyaddition process.

For this purpose, the polyisocyanate mixtures are preferably used in the form of aqueous emulsions which can be reacted in combination with polyhydroxyl compounds dispersed in water in the context of aqueous two-component systems.

The polyisocyanate mixtures comprising sulfonate groups according to the invention are particularly preferably used as crosslinkers for paint binders or paint binder components, dissolved or dispersed in water, that have groups reactive to isocyanate groups, especially alcoholic hydroxyl groups, in the production of coatings using aqueous coating compositions based on such binders or binder components. The crosslinker, optionally in emulsified form, can be combined with the binders or binder components here by simple stirring by any desired methods prior to processing the coating compositions or even by using two-component spray guns.

Paint binders or paint binder components which may be mentioned in this context for example include: polyacrylates comprising hydroxyl groups, dissolved or dispersed in water, especially those of the molecular weight range 1000 to 20 000, which are valuable two-component binders with organic polyisocyanates as crosslinkers, or optionally urethane-modified polyester resins comprising hydroxyl groups, dispersed in water, of the type known from polyester and alkyd resin chemistry. In principle, suitable as reaction partners for the polyisocyanate mixtures according to the invention are any binders, dissolved or dispersed in water, comprising groups that are reactive to isocyanates. These also include, for example, polyurethanes or polyureas dispersed in water, which can be crosslinked with polyisocyanates due to the active hydrogen atoms present in the urethane or urea groups.

The present invention further relates to a coating composition comprising at least one polyisocyanate containing sulfonate groups according to the invention.

In the case of use according to the invention as crosslinker component for aqueous paint binders, the polyisocyanate mixtures comprising sulfonate groups according to the invention are generally used in such amounts that correspond to an equivalent ratio of NCO groups to groups that are reactive to NCO groups, especially alcoholic hydroxyl groups, from 0.5:1 to 2:1.

The polyisocyanate mixtures according to the invention may optionally be admixed in minor amounts, however, with non-functional aqueous paint binders, for the purpose of achieving very specific properties, as an additive for improving adhesion, for example.

The polyisocyanate mixtures according to the invention can of course also be used in a form in which they are blocked with blocking agents known per se from polyurethane chemistry, in combination with the aforementioned aqueous paint binders or paint binder components, as aqueous one-component PUR baking systems. Suitable blocking agents are, for example, diethyl malonate, ethyl acetoacetate, acetone oxime, butanone oxime, ε-caprolactam, 3,5-dimethylpyrazole, 1,2,4-triazole, dimethyl-1,2,4-triazole, imidazole or any desired mixtures of these blocking agents.

Substrates contemplated for the aqueous coatings formulated using the inventive polyisocyanate mixtures comprising sulfonate groups include any desired substrates, such as, for example, metal, wood, glass, stone, ceramic materials, concrete, rigid and flexible plastics, textiles, leather, and paper, which prior to coating may optionally also be provided with customary primers.

In general, the aqueous coating compositions formulated with the polyisocyanate mixtures according to the invention, into which compositions, optionally, the auxiliaries and additives customary in the coatings sector may be incorporated, examples being flow control assistants, colour pigments, fillers, matting agents or emulsifiers, have technical coatings properties that are good even in the case of room-temperature drying.

Of course, they may alternatively be dried under forced conditions at elevated temperature or by baking at temperatures up to 260° C.

The present invention further provides a substrate coated with a coating composition according to the invention optionally cured by the action of heat.

On account of their excellent water emulsifiability, which enables a homogeneous, particularly finely divided distribution in aqueous paint binders, the use of the polyisocyanate mixtures according to the invention as crosslinker component for aqueous polyurethane coatings results in coatings with outstanding optical properties, especially high surface gloss, flow and high transparency.

In addition to the preferred use as crosslinker components for aqueous 2K-PUR coatings, the polyisocyanate mixtures comprising sulfonate groups according to the invention are outstandingly suitable as crosslinkers for aqueous dispersion adhesives, leather and textile coatings or textile printing pastes, as AOX-free paper auxiliaries or even as additives for mineral building materials, for example concrete or mortar.

The features specified as preferred for the process according to the invention are also preferred for the further subject matters of the invention.

The examples which follow serve to illustrate the present invention, but should in no way be understood as imposing any restriction on the scope of protection.

EXAMPLES

All reported percentages are based on weight unless otherwise stated.

NCO contents were determined titrimetrically in accordance with DIN EN ISO 11909:2007-05.

All viscosity measurements were recorded with a Physica MCR 51 rheometer from Anton Paar Germany GmbH (DE) according to DIN EN ISO 3219:1994-10 at a shear rate of 250 s−1.

The residual monomer contents were measured according to DIN EN ISO 10283:2007-11 by gas chromatography with an internal standard.

Water contents were determined by volumetric titration by Karl Fischer in accordance with DIN 53715 (created based on DIN 51777 Part 1 (1973 edition)) using a Titrando 841 automatic titration unit from Methrom. The measurement range of this method is from 0.01 to 99% by weight.

The median particle sizes (MPS) of 25% aqueous emulsions serve as a measure of the emulsifiability of the hydrophilic polyisocyanates. For this purpose, 25 g of the inventive polyisocyanate mixture in each case were added to 75 g of deionized water in an Erlenmeyer flask, corresponding to a solids content of 25% by weight in each case, and then the mixtures were each stirred for 1 min at 900 rpm with the aid of a magnetic stirrer. The median particle sizes [nm] of the aqueous emulsions obtained in this manner were then determined using a DTS 5100 type Zetasizer from Malvern Instruments GmbH (DE). The smaller the median particle size, the finer the distribution of a crosslinker in the aqueous phase (paint binder) and the clearer and more brilliant the coating films obtained.

The Hazen colour number was measured by spectrophotometry according to DIN EN ISO 6271-2:2005-03 with a LICO 400 spectrophotometer from Lange, Germany.

Starting Compounds
Polyisocyanates A)
Starting Polyisocyanate A1)

HDI polyisocyanate comprising isocyanurate groups, produced by catalytic trimerization of HDI based on Example 11 of EP-A 330 966, with the modification that the reaction was stopped by addition of dibutyl phosphate at an NCO content of the crude mixture of 40%. Subsequently, unconverted HDI was removed by thin-film distillation at a temperature of 130° C. and a pressure of 0.2 mbar.
NCO content: 21.7%
NCO functionality: 3.4
Monomeric HDI: 0.1%
Viscosity (23° C.): 3,080 mPas
Colour number (Hazen): 18
Starting Polyisocyanate A2)

IPDI polyisocyanate containing isocyanurate groups, prepared by catalytically trimerizing IPDI according to example 2 of EP-A-0 003 765. The reaction was deactivated at an NCO content of the crude mixture of 30.1% by addition of an equimolar amount of dibutyl phosphate, based on the amount of catalyst used, and further stirring for 30 minutes at 80° C. Unconverted IPDI was then removed by thin-film distillation at a temperature of 170° C. and a pressure of 0.3 mbar and the resulting solid resin was diluted with butyl acetate to a solids content of 70%.
NCO content: 11.9%
NCO functionality: 3.3
Monomeric IPDI: 0.28%
Viscosity (23° C.): 620 mPas
Colour number (Hazen): 14
Starting Polyisocyanate A3)

PDI polyisocyanate comprising isocyanurate groups, produced by catalytic trimerization of PDI by the method described in WO 2016/146579 for the polyisocyanate component A2). The reaction was deactivated at an NCO content of the crude mixture of 36.7% by addition of an equimolar amount of dibutyl phosphate, based on the amount of catalyst used, and further stirring for 30 minutes at 80° C. Subsequently, unconverted PDI was removed by thin-film distillation at a temperature of 140° C. and a pressure of 0.5 mbar.
NCO content: 21.8%
NCO functionality: 3.5
Monomeric PDI: 0.09%
Viscosity (23° C.): 9850 mPas
Colour number (Hazen): 34
Aminosulfonic Acids B)

The aminosulfonic acids used were 3-(cyclohexylamino)propanesulfonic acid (Sigma-Aldrich Chemie Gmbh, Munich, DE), water content of the supply form: 1.7%, and 4-(cyclohexylamino)butanesulfonic acid (Santa Cruz Biotechnology, Inc., Heidelberg, DE), water content of the supply form: 4.5%.

Starting from these supply forms, different water contents were set in each case by drying under vacuum (100° C./ca. 0.5 mbar) over periods of 30 min up to 12 h. The water contents of the aminosulfonic acids used in the examples are stated therein in each case in the following.
Non-Ionic Hydrophilic Organic Compound C)

Methoxypolyethylene glycol MPEG 500 (Ineos Oxide, Cologne, DE), water content 0.02%.

Tertiary Amine D)

The tertiary amine used in all examples was N,N-dimethylcyclohexylamine (Merck Chemicals GmbH, Darmstadt, DE) with a water content of 0.03%.

Example 1 (Non-Inventive)

968.5 g (5.01 val) of the isocyanurate group-containing starting polyisocyanate A1) were stirred together with 20.0 g (0.09 val) of 3-(cyclohexylamino)propanesulfonic acid (CAPS), water content 0.03%, 11.5 g (0.09 mol) of dimethylcyclohexylamine and 0.05 g (50 ppm) of 2,6-di-tert-butyl-4-methylphenol under dry nitrogen at 100° C. until after 5:30 hours a largely clear polyisocanate mixture containing sulfonate groups was present. After cooling to room temperature and filtration over a T 5500 filter layer (Seitz), the following characteristic data were determined:
NCO content: 20.6%
NCO functionality: 3.3
Viscosity (23° C.): 6,400 mPas
Colour number (Hazen): 22
Emulsifiability (MPS): 731 nm Example 2 (Inventive)

The experiment of example 1 was repeated using CAPS with a water content of 0.15%. After a reaction time of 4:15 hours, a clear polyisocanate mixture containing sulfonate groups was obtained which, after filtration, had the following characteristic data:
NCO content: 20.7%
NCO functionality: 3.3
Viscosity (23° C.): 6,440 mPas
Colour number (Hazen): 19
Emulsifiability (MPS): 329 nm The comparison of example 1 (non-inventive) and 2 (inventive) shows that when aminosulfonic acid with a higher water content according to the invention is used, the reaction proceeds significantly more rapidly and a hydrophilic polyisocyanate is obtained which, with similar characteristic data, has a significantly better emulsifiability.

Example 3 to 15 (Inventive and Comparative)

According to the process described in examples 1 and 2, various polyisocyanates A) were reacted using aminosulfonic acids B) with different water contents. Table 1 below shows the composition of the reaction batches in parts by weight and the characteristic data of the products obtained.

TABLE 1

| Example | | 3 Comparative | 4 | 5 | 6 | 7 | 8 | 9 Comparative |
|---|---|---|---|---|---|---|---|---|
| Starting polyisocyanate A1) | [parts by weight] | 957.3 | 957.3 | 957.3 | 957.3 | 957.3 | 957.3 | 957.3 |
| Starting polyisocyanate A2) | [parts by weight] | — | — | — | — | — | — | — |
| Starting polyisocyanate A3) | [parts by weight] | — | — | — | — | — | — | — |
| CAPS | [parts by weight] | 27.1 | 27.1 | 27.1 | 27.1 | 27.1 | 27.1 | 27.1 |
| CABS | [parts by weight] | — | — | — | — | — | — | — |
| Water content of aminosulfonic acid | [%] | 0.03 | 0.05 | 0.15 | 0.50 | 0.90 | 1.5 | 1.7 |
| Dimethylcyclohexylamine | [parts by weight] | 15.6 | 15.6 | 15.6 | 15.6 | 15.6 | 15.6 | 15.6 |
| 2,6-Di-tert-butyl-4-methylphenol | [ppm] | 50 | 50 | 50 | 50 | — | 50 | 50 |
| MPEG 500 | [parts by weight] | — | — | — | — | — | — | — |
| Butyl acetate | [parts by weight] | — | — | — | — | — | — | — |
| Propylene glycol diacetate | [parts by weight] | — | — | — | — | — | — | — |
| Reaction time at 100° C. | [hours] | 5:45 | 4:30 | 3:10 | 2:50 | 3:20 | 3:50 | 5:15 |
| NCO content: | [%] | 20.2 | 20.1 | 20.1 | 20.1 | 20.0 | 19.9 | 19.8 |
| NCO functionality: | calculated | 3.3 | 3.3 | 3.3 | 3.3 | 3.3 | 3.3 | 3.3 |
| Viscosity (23° C.): | [mPas] | 6460 | 6100 | 6370 | 6310 | 6870 | 6880 | 8250 |

TABLE 1-continued

| | | | | | | | | |
|---|---|---|---|---|---|---|---|---|
| Solids content | [%] | 100 | 100 | 100 | 100 | 100 | 100 | 100 |
| Colour number (Hazen): | | 22 | 18 | 22 | 20 | 55 | 20 | 18 |
| Emulsifiability (MPS): | [nm] | 405 | 283 | 228 | 236 | 269 | 318 | 417 |

| Example | | 10 Comparative | 11 | 12 Comparative | 13 | 14 Comparative | 15 |
|---|---|---|---|---|---|---|---|
| Starting polyisocyanate A1) | [parts by weight] | 956.6 | 956.6 | — | — | — | — |
| Starting polyisocyanate A2) | [parts by weight] | — | — | 911.1 | 911.1 | — | — |
| Starting polyisocyanate A3) | [parts by weight] | — | — | — | — | 858.0 | 858.0 |
| CAPS | [parts by weight] | — | — | 19.2 | 19.2 | 26.7 | 26.7 |
| CABS | [parts by weight] | 28.2 | 28.2 | — | — | — | — |
| Water content of aminosulfonic acid | [%] | 0.04 | 0.3 | 0.03 | 0.15 | 0.03 | 0.15 |
| Dimethylcyclohexylamine | [parts by weight] | 15.2 | 15.2 | 11.0 | 11.0 | 15.6 | 15.6 |
| 2,6-Di-tert-butyl-4-methylphenol | [ppm] | 50 | 50 | 50 | 50 | 50 | 50 |
| MPEG 500 | [parts by weight] | — | — | 32.0 | 32.0 | — | — |
| Butyl acetate | [parts by weight] | — | — | 26.7 | 26.7 | — | — |
| Propylene glycol diacetate | [parts by weight] | — | — | — | — | 100.0 | 100.0 |
| Reaction time at 100° C. | [hours] | 6:15 | 4:45 | 5:50 | 4:30 | 5:45 | 4:10 |
| NCO content: | [%] | 20.0 | 20.1 | 10.2 | 10.2 | 18.1 | 18.2 |
| NCO functionality: | calculated | 3.3 | 3.3 | 3.1 | 3.1 | 3.4 | 3.4 |
| Viscosity (23° C.): | [mPas] | 6620 | 6800 | 6350 | 5940 | 5130 | 4990 |
| Solids content | [%] | 100 | 100 | 70 | 70 | 90 | 90 |
| Colour number (Hazen): | | 23 | 26 | 18 | 22 | 30 | 27 |
| Emulsifiability (MPS): | [nm] | 475 | 173 | 390 | 288 | 310 | 205 |

Examples 3 to 15 show that the reaction of polyisocyanates with aminosulfonic acids having very low water contents of <0.05% (examples 3, 10, 12, 14) requires significantly longer reaction times than the reaction with aminosulfonic acids, the water content of which is in the range defined according to the invention. The hydrophilic polyisocyanates obtained in this way show a significantly poorer emulsifiability in comparison with products produced according to the invention having otherwise the same product composition. The use of an aminosulfonic acid with a water content >1.5% (example 9), owing to increased urea formation, results in a product with lower NCO content and increased viscosity, which is also much more difficult to emulsify in water than the polyisocyanates which were produced using aminosulfonic acids with water contents in the claimed range.

Example 16 (Non-Inventive)

To 50.0 g of dimethylcyclohexylamine, water content 0.03%, were added 1.3 g of water at room temperature and the mixture was homogenized by stirring for 10 minutes. The water content of the dimethylcyclohexylamine was then 2.56%.

956.9 g (4.94 val) of the isocyanurate group-containing starting polyisocyanate A1) were stirred together with 27.1 g (0.12 val) of 3-(cyclohexylamino)propanesulfonic acid (CAPS), water content 0.03%, 16.0 g (0.12 mol) of dimethylcyclohexylamine described above, water content 2.56%, and 0.05 g (50 ppm) of 2,6-di-tert-butyl-4-methylphenol under dry nitrogen at 100° C. for 5:00 hours. After cooling to room temperature and filtration through a filter layer T 5500 (Seitz), a polyisocyanate containing sulfonate groups was obtained with the following characteristics:
NCO content: 20.0%
NCO functionality: 3.3
Viscosity (23° C.): 7210 mPas
Colour number (Hazen): 18
Emulsifiability (MPS): 576 nm The total water content in the reaction mixture was 0.041% in each case in non-inventive example 16 and also in inventive example 8. The comparison of the examples shows that the hydrophilic polyisocyanate mixture obtained from example 16 has a higher viscosity and a significantly poorer emulsifiability with an otherwise identical product composition.

The invention claimed is:

1. A process for producing polyisocyanates containing sulfonate groups, comprising a reaction of
   A) at least one polyisocyanate component with
   B) at least one aminosulfonic acid comprising at least one amino group and at least one sulfonic acid group, and optionally
   C) at least one non-ionic hydrophilic or hydrophobic organic compound comprising at least one group reactive to isocyanates, in the presence of
   D) at least one tertiary amine and optionally in the presence of
   E) other auxiliaries and additives
   characterized in that
   the aminosulfonic acid B) has a water content of 0.05 to 1.5% by weight.

2. The process as claimed in claim 1, characterized in that the polyisocyanate component A) are polyisocyanates having a uretdione, isocyanurate, allophanate, biuret, iminooxadiazinedione and/or oxadiazinetrione structure having exclusively aliphatically and/or cycloaliphatically bonded isocyanate groups.

3. The process as claimed in claim 1, characterized in that the aminosulfonic acid B) are substituted aromatic sulfonic acids which have up to three sulfonic acid groups and comprises up to three primary or secondary amino groups, wherein the positions on the aromatic ring in the position ortho to the amino group are unsubstituted.

4. The process as claimed in claim 3, characterized in that the aminosulfonic acid component B) is 4-aminotoluene-2-sulfonic acid, 5-aminotoluene-2-sulfonic acid and/or 2-aminonaphthalene-4-sulfonic acid.

5. The process as claimed in claim 1, characterized in that the aminosulfonic acid component B) is an amino-functional sulfonic acid of the general formula (II)

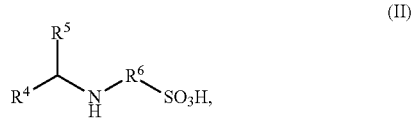

in which $R^4$ and $R^5$ are each independently identical or different radicals and are hydrogen or saturated or unsaturated, linear or branched, aliphatic or cycloaliphatic or aromatic organic radicals having 1 to 18 carbon atoms, which are substituted or unsubstituted and/or comprise heteroatoms in the chain, wherein $R^4$ and $R^5$, also in combination with each other and optionally with one further nitrogen atom or one oxygen atom, may form cycloaliphatic or heterocyclic rings having 3 to 8 carbon atoms, which may optionally be further substituted, and $R^6$ is a linear or branched aliphatic radical having 2 to 6 carbon atoms.

6. The process as claimed in claim 5, characterized in that the aminosulfonic acid component B) is 2-isopropylaminoethane-1-sulfonic acid, 3-isopropylaminopropane-1-sulfonic acid, 4-isopropylaminobutane-1-sulfonic acid, 2-cyclohexylaminoethane-1-sulfonic acid, 3-cyclohexylaminopropane-1-sulfonic acid and/or 4-cyclohexylaminobutane-1-sulfonic acid.

7. The process as claimed in claim 1, characterized in that the aminosulfonic acid component B) is used in an amount of 0.3 to 25.0% by weight, based on the total weight of the components A) and B).

8. The process as claimed in claim 1, characterized in that the non-ionic hydrophilic or hydrophobic organic compounds C) are pure polyethylene oxide polyether alcohols and/or mixed polyalkylene oxide polyether alcohols, the alkylene oxide units of which consist of ethylene oxide units to an extent of at least 70 mol %, and/or aliphatic alcohols or fatty acid ester alcohols, which comprise in each case at least 8 carbon atoms.

9. The process as claimed in claim 1, characterized in that the tertiary amines D) are N,N-dimethylbutylamine, N,N-dimethyl-2-ethylhexylamine, N,N-diethylmethylamine, N,N-diisopropylethylamine, N,N-diisopropyl-2-ethylhexylamine, N,N-dimethylcyclohexylamine, N,N-dicyclohexylmethylamine, N-methylpyrrolidine, N-methylpiperidine, N-ethylpiperidine, N-methylmorpholine, N-ethylmorpholine, N-isobutylmorpholines, and mixtures thereof.

10. The process as claimed in claim 1, characterized in that the auxiliaries and additives E) are antioxidants and/or catalysts.

11. The process as claimed in claim 1, characterized in that the aminosulfonic acids B) have a water content of 0.1 to 1.0% by weight, or 0.15 to 0.9% by weight, or 0.2 to 0.6% by weight.

12. The polyisocyanates containing sulfonate groups obtained by the process as claimed in claim 1.

13. A coating composition comprising polyisocyanates containing sulfonate groups as claimed in claim 12.

* * * * *